US006660207B1

(12) United States Patent
Youn

(10) Patent No.: US 6,660,207 B1
(45) Date of Patent: Dec. 9, 2003

(54) METHOD FOR APPLYING GRAPHIC IMAGES TO CANDLES

(76) Inventor: Je Dong Youn, 14802 N. Florida Ave., Tampa, FL (US) 33613

( * ) Notice: Subject to any disclaimer, the term of this patent is extended or adjusted under 35 U.S.C. 154(b) by 0 days.

(21) Appl. No.: 09/683,951

(22) Filed: Mar. 6, 2002

(51) Int. Cl.[7] ............................................. B29C 39/10
(52) U.S. Cl. ...................... 264/259; 264/338; 425/803
(58) Field of Search ................................. 264/219, 299, 264/259, 338; 425/803

(56) References Cited

U.S. PATENT DOCUMENTS

| | | | | |
|---|---|---|---|---|
| 2,122,451 A | * | 7/1938 | Cassimatis | 264/245 |
| 3,867,501 A | * | 2/1975 | Powers et al. | 264/219 |
| 4,030,959 A | * | 6/1977 | Meisner et al. | 156/457 |
| 5,597,300 A | * | 1/1997 | Wohl et al. | 431/288 |
| 5,697,694 A | * | 12/1997 | Cutts | 362/161 |
| 6,153,137 A | * | 11/2000 | Youn et al. | 264/136 |
| 6,228,304 B1 | * | 5/2001 | Silbergeld | 264/225 |

* cited by examiner

*Primary Examiner*—Allan R. Kuhns
(74) *Attorney, Agent, or Firm*—Ronald E. Smith; Smith & Hopen, P.A.

(57) ABSTRACT

A method of applying a graphic image to a candle includes the step of printing a graphic image onto a thick sheet of paper. The paper is folded or otherwise conformed to the shape of the mold and is inserted into the cavity of the mold such that the printed image is on an interior surface of the paper. Molten wax is then introduced into the cavity and allowed to cure. As the molten wax cures, the graphic image transfers from the paper to the wax. After the wax has cured, the resulting candle is removed from the mold and the paper is removed from the external surface of the candle. The graphic image, which may be any image, including a photograph, appears clearly and distinctly on the exterior surface of the candle.

3 Claims, 2 Drawing Sheets

US 6,660,207 B1

METHOD FOR APPLYING GRAPHIC IMAGES TO CANDLES

BACKGROUND OF INVENTION

1. Field of the Invention

This invention relates, generally, to the art of candle making. More particularly, it relates to a method for applying graphic images to candles using newsprint ink.

2. Description of the Prior Art

The most relevant prior disclosure is found in U.S. Pat. No. 6,153,137, entitled Method For Applying Graphic Images To Candles, awarded Nov. 28, 2000 to the present inventor and others. That disclosure teaches how to transfer graphic images to candles by positioning atop molten wax tissue paper carrying a graphic image. After the molten wax has entered the interstitial spaces of the tissue paper, the tissue is placed inside a mold and wax is poured thereinto. The tissue and graphic image thereon thus become an integral part of the candle, and the graphic image on the candle is free of bubbles and wrinkles.

The only drawback of the earlier process is that the step of positioning a piece of tissue paper atop molten wax in a container, followed by positioning the soaked tissue in a mold, is somewhat time-consuming.

It follows that an improved process is needed. For example, it would be advantageous if a process could be found that did not require soaking a piece of tissue paper with molten wax.

However, in view of the prior art considered as a whole at the time the present invention was made, it was not obvious to those of ordinary skill in the pertinent art how an improved method for transferring graphic images to candles could be fulfilled.

SUMMARY OF INVENTION

The longstanding but heretofore unfulfilled need for an improved method of applying a graphic image to a candle is now met by a new, useful, and nonobvious invention. The novel method begins with the step of printing a predetermined graphic image onto a sheet of paper having a predetermined thickness. The ink used in the printing is preferably the type of ink used in printing newspapers. A candle mold of predetermined configuration is provided. The sheet of paper is folded or otherwise shaped to conform to the predetermined configuration of the cavity defined by the mold. The formed sheet of paper is inserted into the mold cavity such that the predetermined graphic image is positioned on an interior surface of the paper. Molten wax is then poured into the mold and allowed to cure into a candle. The candle is removed from the mold and the paper is removed from the candle. The predetermined graphic image appears clearly and distinctly on an exterior surface of the candle.

The predetermined configuration of the mold may be cylindrical, square, triangular, elliptical, and so on, i.e., the mold may have any predetermined configuration having utility as a candle mold. The paper is formed into whatever complementary configuration is required to match the upstanding interior walls of the mold.

A primary object of the invention is to provide a method for transferring graphic images onto candles that can be accomplished in less time than the prior art method that relies upon the use of tissue paper.

A closely related object is to provide a method that produce graphic images on candles that is free of imperfections such as bubbles.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
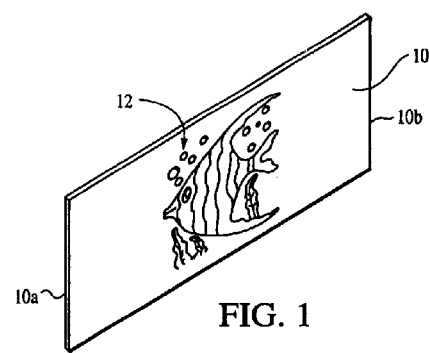
FIG. 1 is a perspective view of a thick sheet of paper bearing a graphic image thereon.

Referring to FIG. 1, it will there be seen that the reference numeral 10 denotes a thick sheet of paper having a graphic image 12 imprinted thereon. The paper thickness is substantially equal to the thickness of cardstock. Graphic image 12 in this illustrative embodiment is that of a tropical fish, but it should be understood that the graphic image may be any printable graphic image, including photographs.

The ink used to print the graphic image upon thick paper 10 is preferably the type of ink used when printing newspapers. For convenience, such ink will be referred to as newsprint ink. Such ink is usually characterized as having low, medium, or high rub resistance. The novel method works with inks having low, medium, and high rub resistance. Ink used for other purposes but having the same characteristics as newsprint ink is also within the scope of this invention.

Figure 2:
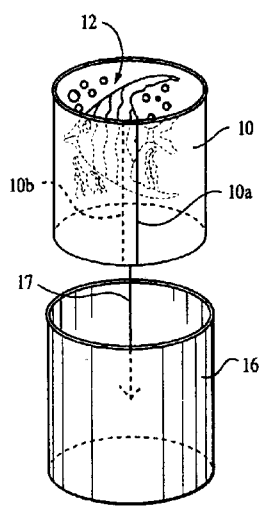
FIG. 2 is an exploded perspective view depicting how the thick sheet of paper of FIG. 1 is rolled into a cylinder so that it may be positioned inside a cylindrical mold.

Graphic image 12 is applied to thick paper 10 by any conventional printing means. Any printable graphical image may be employed, including photographs. As indicated in FIG. 2, the paper is then formed into a cylindrical shape with graphic image 12 facing the interior of the cylinder and said paper is inserted into a cylindrical mold 16 as suggested by directional arrow 17. Mold 16 may be manufactured of any suitable mold material. The preferred material is aluminum.

Mold 16 may have any shape that is practical for a candle mold, such as square, triangular, pentagonal, elliptical, and so on. For each mold shape, paper 10 is folded or otherwise formed so that it overlies the interior mold walls.

Figure 3:
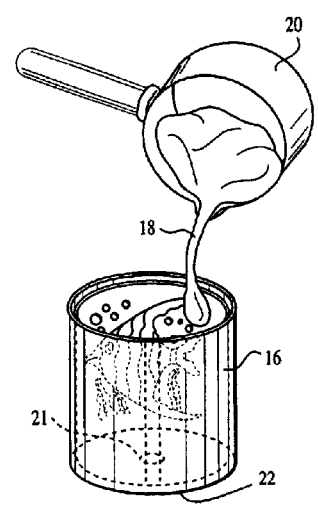
FIG. 3 is a perspective view depicting the pouring of molten wax into a mold lined with thick paper having a graphic image thereon.
Figure 4:
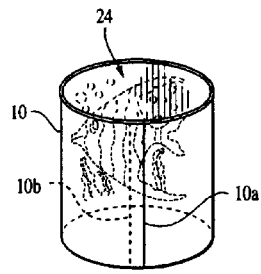
FIG. 4 is a perspective view of the candle after is has been removed from the mold but before the thick paper has been removed therefrom.
Figure 5:
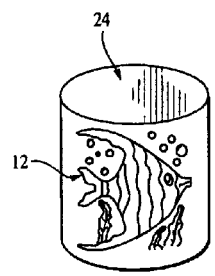
FIG. 5 is a perspective view of a candle bearing a graphic image thereon that is manufactured in accordance with the novel method.

As indicated in FIG. 3, molten wax 18 is then poured from a ladle 20 into mold 16 and allowed to cure. A small central aperture 21 (smaller than depicted so that molten wax does not flow therethrough) is formed in bottom wall 22 of mold 16 to facilitate ejection of the cured candle from said mold. When ejected, thick paper 10 is adhered to candle 24 as depicted in FIG. 4. Said thick paper is then peeled from the candle and a finished candle having graphic image 12 thereon is produced as depicted in FIG. 5. The wick, not shown, is added during the FIG. 3 step but the wick-adding process is well-known in the art of candle making and need not be disclosed here.

Thick paper 12 is easier to handle than the tissue paper of the prior art. Moreover, there is no need to soak the paper atop molten wax and to carefully apply the soaked paper to the interior wall of a mold. Instead. Thick paper 12 is easily handled and can be inserted quickly and easily into a mold. The hot molten wax does not contact the graphic image until such molten wax is poured into the mold. The heat of the wax then transfers the printed image onto the candle. By the time the wax has cooled and a candle has been formed, the transfer process is complete and the image that appears on the candle when the thick paper has been peeled therefrom is sharp, detailed, and free of distortions. The candle is therefore very attractive and constitutes a highly desirable consumer item.

Where a square candle is desired, mold 16 is square in configuration and paper 10 is folded so that it conforms to the shape of the mold. For any desired candle shape, mold 16 is manufactured accordingly and paper 10 is folded or shaped as needed to conform thereto.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A method for applying a graphic image to a candle, comprising the steps of:

printing a predetermined graphic image onto a thick sheet of paper having a predetermined thickness;

said thick sheet of paper having a thickness substantially equal to that of cardstock;

using newsprint ink when printing said predetermined graphic image;

providing a candle mold of predetermined configuration;

forming said sheet of thick paper to conform to said predetermined configuration;

inserting said formed sheet of thick paper into said mold such that said predetermined graphic image is positioned on an interior surface of said thick paper;

pouring molten wax into said mold and allowing said molten wax to cure into a candle;

removing the candle from said mold; and removing the thick paper from the candle;

whereby said predetermined graphic image appears on said candle.

2. The method of claim 1, wherein said predetermined configuration of said mold is cylindrical and wherein said thick paper is formed into a complementary cylindrical configuration.

3. The method of claim 1, wherein said predetermined configuration of said mold is square and wherein said thick paper is formed into a complementary square configuration.

* * * * *